United States Patent [19]

Cooke et al.

[11] Patent Number: 4,823,146

[45] Date of Patent: Apr. 18, 1989

[54] CARTRIDGE AND METHOD OF USING A CARTRIDGE FOR PHASE CHANGE INK IN AN INK JET APPARATUS

[75] Inventors: Theodore M. Cooke, Danbury, Conn.; Arthur Mikalsen, Carmel, N.Y.; Ernest O. Belmont, New Milford; R. H. Van Brimer, Southbury, both of Conn.

[73] Assignee: Dataproducts Corporation, Woodland Hills, Calif.

[21] Appl. No.: 175,764

[22] Filed: Mar. 31, 1988

Related U.S. Application Data

[63] Continuation-in-part of Ser. No. 829,572, Feb. 14, 1986, Pat. No. 4,739,339.

[51] Int. Cl.$^4$ ........................ G01D 15/16; G01D 9/00

[52] U.S. Cl. ................................ 346/1.1; 346/140 R

[58] Field of Search ............ 346/140 R, 140 PD, 1.1, 346/76 PH; 400/120, 126

[56] References Cited

U.S. PATENT DOCUMENTS 4,631,557 12/1986 Cooke .......................... 346/140 PD 4,739,339 4/1988 DeYoung ..................... 346/140 PD

*Primary Examiner*—E. A. Goldberg

*Assistant Examiner*—Mark Reinhart

*Attorney, Agent, or Firm*—Woodcock Washburn Kurtz Mackiewicz & Norris

[57] ABSTRACT

An improved cartridge for containing a pellet of hot melt or phase change ink in an ink jet apparatus having at least one ink jet, a reservoir for containing and melting the hot melt or phase change ink from its solid state to a liquid state, and a receiver adapted to receive the cartridge, wherein the receiver includes an outlet at the base thereof for flowing liquified ink into the reservoir, and wherein the pellet is comprised of a size and shape so as to substantially fill the receiving means. The improvement consists of a hollow member of a predetermined geometry corresponding substantially to the geometry of the receiver, open at one end and deformable so as to permit the discharge of the pellet contained within the member through its open end, a retainer for the pellet, and a seal at the open end to protect against contamination of the ink.

29 Claims, 2 Drawing Sheets

CARTRIDGE AND METHOD OF USING A CARTRIDGE FOR PHASE CHANGE INK IN AN INK JET APPARATUS

CROSS REFERENCE TO RELATED APPLICATIONS

This application is a continuation-in-part of U.S. Ser. No. 829,572, filed Feb. 14, 1986 now U.S. Pat. No. 4,739,339 issued Apr. 19, 1988.

BACKGROUND OF THE INVENTION

This invention relates generally to ink jet apparatus, and more particularly to ink jet apparatus wherein the ink employed within the jet is of the phase change type which may also be referred to as hot melt ink.

A phase change or hot melt ink of the type utilized in an ink jet apparatus is characteristically solid at room temperature. When heated, the ink will melt to a consistency so as to be jettable. Examples of hot melt inks suitable for use in ink jet apparatus are disclosed in U.S. Pat. Nos. 4,390,369, 4,484,948, and U.S. Pat. No. 4,659,383, each of which are assigned to the assignee of the present invention, and are incorporated herein by reference. A hot melt ink jet apparatus and method of operation, suitable for use with the above-referenced hot melt inks, is also disclosed in U.S. Ser. No. 610,627, filed May 16, 1984, now abandoned in favor of its continuation U.S. Ser. No. 938,334, filed Dec. 4, 1986, which in turn was abandoned in favor of U.S. Ser. No. 093,151, filed Sept. 2, 1987, each of which is also assigned to the assignee of the present invention, and is incorporated herein by reference.

When employing ink in a liquid state, the delivery of the ink is, of course, dictated by the liquid state. Typically, the ink is contained within a closed vessel of some sort prior to its delivery to the ink jet. The delivery of ink when employing hot melt ink, however, requires a different approach in order to provide a reliable supply of ink while at the same time minimize operator intervention. The hot melt inks described herein above may be conveniently carried by a cartridge. One hot melt cartridge carrying a single block of hot melt ink is disclosed in U.S. Pat. No. 4,631,557, which is assigned to the assignee of the present invention, and is incorporated herein by reference. In that cartridge, the hot melt ink is melted while in the cartridge so as to supply the ink jet apparatus. Another cartridge, comprising a plurality of blocks which are advanced while in the cartridge to a position where they are released into a hopper or reservoir of the ink jet apparatus in the solid state form, is disclosed in U.S. Pat. No. 4,667,206, which is also assigned to the assignee of the present invention, and is incorporated herein by reference.

Still other versions of a cartridge and method of using the cartridge for phase change or hot melt ink in an ink jet apparatus are disclosed in co-pending U.S. Ser. No. 829,572, to which the present application is a continuation-in-part. As is taught therein, a cartridge for hot melt or phase change ink is tubular, having a cover at one end and an opening at the other end. Upon engagement and cooperation between the cartridge and a reservoir of the ink jet apparatus, solid ink is dropped under the influence of gravity through the opening in the cartridge into the ink jet apparatus. Otherwise, the solid ink is retained in the cartridge until such cooperation is achieved, the cooperation including a keying of the cartridge to the reservoir and forming a seal of an inlet to the reservoir between the cartridge and the reservoir.

One problem that is evident in the design of each of the above described cartridges is their relative complexity. That is, in order to provide a cartridge which is both capable of storing a supply of hot melt or phase change ink and of insuring that the ink jet apparatus within which the cartridge is used operates in an effective manner without undue operator intervention, the cartridges disclosed in the above described patents and co-pending applications are difficult to manufacture, thereby leading to an increased cost of production. It would, therefore, be desirable to provide a simplified cartridge which would be produced at a low cost.

Another problem associated with each of the above described cartridges is that they fail to provide for a reasonable means to prevent tampering with or contamination of the hot melt or phase change ink contained therein. That is, with the exception of the cartridge embodiment that is illustrated by Fig. 1 of the above referenced U.S. Ser. No. 829,572, none of the cartridges described above seal their open ends. A snap-fit cover is shown in FIG. 1 of U.S. Ser. No. 829,572, but such design necessitates the removal of the cover by the operator prior to the loading of the cartridge in the ink jet apparatus. Accordingly, it would also be desirable to provide a cartridge for containing hot melt or phase change ink, protected against contamination, which would further reduce operator intervention during the loading thereof in an ink jet apparatus.

SUMMARY OF THE INVENTION

It is, therefore, a general object of the present invention to provide a cartridge and method of using the cartridge for phase change ink in an ink jet apparatus. More specifically, it is an object of the present invention to provide an improved cartridge and method of using the cartridge for protecting the phase change ink contained in such cartridge against contamination.

Another object of the present invention is to provide a cartridge and method of using the cartridge for phase change ink in an ink jet apparatus which minimizes operator intervention.

Still another object of the present invention is to provide a simplified cartridge having a low cost of production.

Briefly, these and others objects of the present invention are accomplished by an improved cartridge for containing a pellet of hot melt or phase change ink in an ink jet apparatus having at least one ink jet, a reservoir for containing and melting the hot melt or phase change ink from its solid state to a liquid state, and a receiving means of a predetermined geometry that is adapted to receive the cartridge. The receiving means includes an outlet at the base thereof for flowing liquified ink into the reservoir, and the pellet is comprised of a size and shape so as to substantially fill the receiving means. The improvement in accordance with presently preferred embodiments of the invention comprises a hollow member, open at one end and deformable so as to permit the discharge of the pellet contained within the member through its open end, means for retaining the pellet within the member, and means for sealing the open end to protect against contamination.

According to one embodiment of the present invention, the member is open at both ends, each end being sealed for example by a thin film. The film at one end may include a tab portion for its easy removal, or may be frangible so as to obviate the step of its removal by an operator. On the other hand, the film sealing the other end is adapted to remain in place thus sealing the cartridge while loaded in the ink jet apparatus.

In accordance with a second embodiment of the present invention, the member comprises a metallic cup having formed at its open end a flange adapted to be mated with the receiving means. The retaining means, according to this second embodiment, comprises a portion of the cup having a substantially elliptical cross-section adapted to be deformed to release the pellet from the cup.

In yet a third embodiment according to the present invention, the member comprises a first portion proximate to the open end and a second, deformable portion adapted to be depressed by the operator to push the pellet out of the cartridge and into the ink jet apparatus. The wall thickness of the second portion is selected to be thinner than the corresponding wall thickness of the first portion, such that the second portion will collapse upon the first portion thereby loading the pellet while at the same time sealing the ink jet apparatus.

Other objects, advantages and novel features of the invention will become more apparent from the following detailed description of the invention when considered in conjunction with the accompanying drawings wherein:

DETAILED DESCRIPTION OF THE INVENTION

Figure 1A:
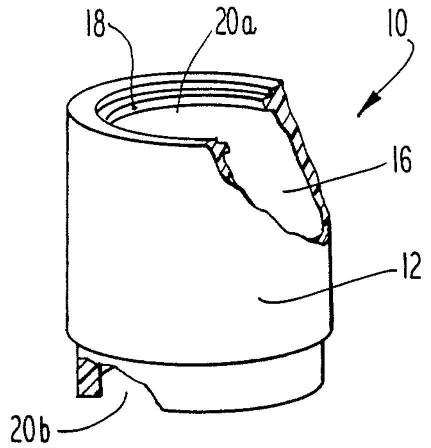
FIGS. 1*a*, 1*b* and 1*c* illustrate a cartridge and method of using the cartridge for phase change ink in an ink jet apparatus according to a first embodiment of the present invention.
Figure 1B:
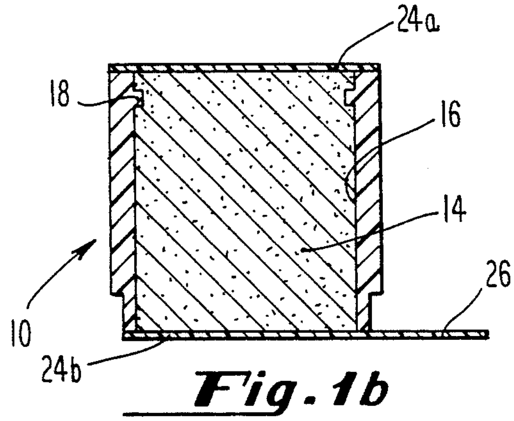
Figure 1C:
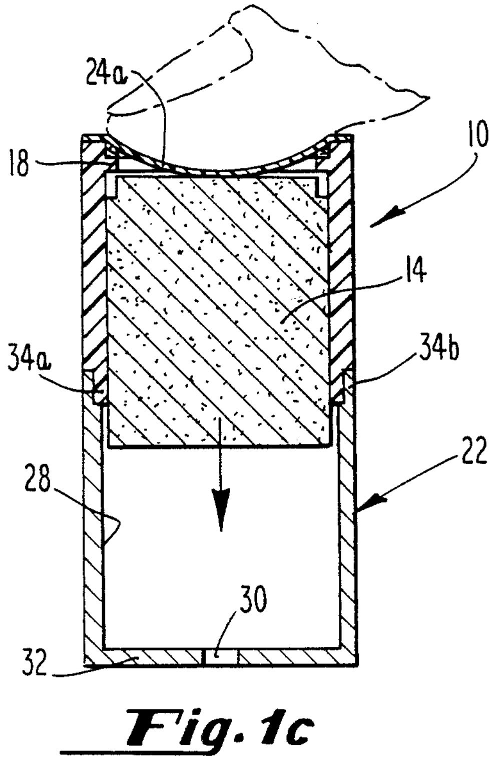

Referring now to the drawings, wherein like characters designate like or corresponding parts throughout the several views, there is shown in FIGS. 1*a*, 1*b* and 1*c* a cartridge 10 and method of using the cartridge 10 for phase change ink in an ink jet apparatus according to the present invention. As shown in FIGS. 1*a* and 1*b*, the cartridge 10 is comprised of a member 12 (substantially tubular-shaped as shown in FIG. 1) which is adapted to receive a solid pellet 14 of phase change or hot melt ink within a cavity 16. It should be noted at this juncture that the terms "phase change" and "hot melt" as used herein are interchangeable, and are intended to portray an ink which is both solid at room temperature and yet jettable in a liquid form at an elevated temperature above the ambient.

In order to retain the pellet 14 of ink within the cavity 16, the member 12 includes a rib 18 integrally formed on its inside diameter. The rib 18 is conveniently formed not only to prevent the pellet 14 from accidentally falling out of either of two open ends **20*a* and 20*b* of the member 12, but also is shallow enough so as not to require an excessive amount of pressure when discharging the pellet 14 into a receiving means 22** (FIG. 1*c*) formed in the ink jet apparatus. After the pellet 14 of ink is placed within the member 14 (e.g., by filling the member 12 with ink in a liquified form, and thereafter allowing it to cool to the solid state), the member 12 is sealed at both ends **20*a* and 20*b* by means such as a heat-sealable film 24*a* and 24*b*. In such a manner, the pellet 14 of ink contained within the member 12** is protected against contaminants. As is apparent from FIG. 1*b*, the film **24*b* sealing the lower open end 20*b* of the member 12 includes a tab portion 26 to facilitate removal of the film 24*b* prior to loading of the cartridge 10 within the receiving means 22** (FIG. 1*c*). Alternatively, the film **24*b* may be formed of a frangible material, thereby eliminating the need for its removal, so long as the material chosen does not have an adverse impact (e.g., production of particulate matter) on the operation of the ink jet apparatus. The member 12** may be conveniently formed of a heat-resistant plastic, such as polyethylene, in order to provide thermal protection to the operator since the ink jet apparatus will most likely require refilling while in a heated state.

The method of using the cartridge 10 for phase change ink in the ink jet apparatus will now be explained with reference to FIG. 1*c*. As explained briefly herein above, the film **24*b* if necessary is removed from the bottom open end 20*b* of the member 12 before the cartridge lo is loaded within the ink jet apparatus. The member 12 with the pellet 14 of ink contained therein is then inverted over the ink jet apparatus, and inserted into the receiving means 22** thereof.

As explained in greater detail in the above referenced U.S. Ser. No. 829,572, the receiving means 22 is formed to cooperate with the cartridge 10 such that the ink jet apparatus is both sealed from contamination and adapted to be primed for operation. The receiving means 22, as shown in FIG. 1*c*, includes a cylindrical reservoir 28 having an opening 30 in a base portion 32. Moreover, the receiving means 22 and cartridge 10 may include complementary shoulder portions **34*a* and 34*b*, respectively, to help promote engagement between the cartridge 10 and the receiving means 22. It should also be noted at this juncture that while a substantially-tubular shaped member 12 is illustrated herein for cooperation with a cylindrical receiving means 22, any other corresponding hollow shapes (e.g., conical, pyramidal, etc.) may be utilized without departure from the true spirit and scope of the present invention so long as an adequate engagement and cooperation is provided between the cartridge 10 and the reservoir 28** of the ink jet apparatus.

After the cartridge 10 is inverted over and inserted into the receiving means 22, the operator (whose finger is shown diagrammatically in FIG. 1*c*) applies pressure to the film **24*a* enclosing the top open end 20*a* of the member 12, thereby pushing the pellet 14 downwardly within the member 12, fracturing the ink above the rib 18, and allowing the pellet 14 to fall under the influence of gravity into the reservoir 28** where it may be melted by any suitable means.

Figure 2A:
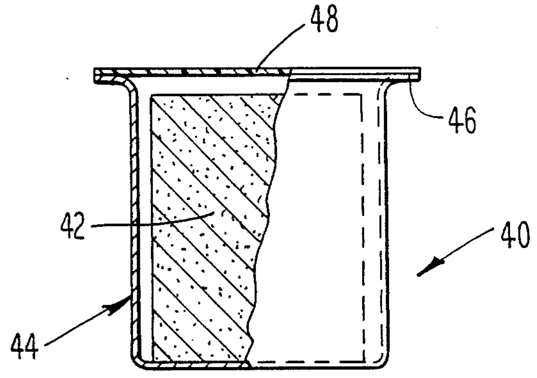
FIGS. 2*a*, 2*b* and 2*c* illustrate a cartridge and method of using the cartridge for phase change ink in an ink jet apparatus according to a second embodiment of the present invention.
Figure 2B:
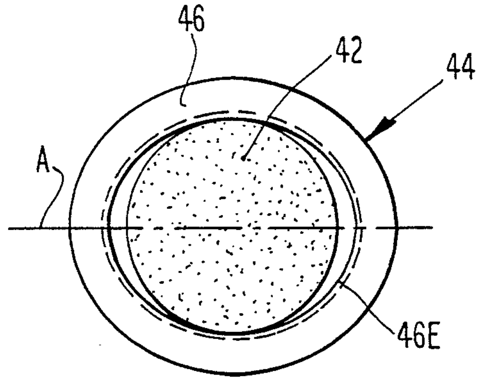
Figure 2C:
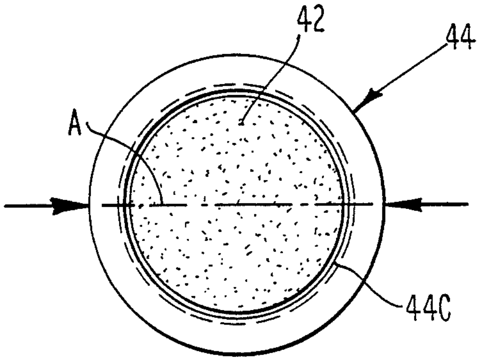

Referring now to FIGS. 2*a*, 2*b* and 2*c*, a second embodiment of the present invention will now be described. As shown in FIG. 2*a*, a cartridge 40 for containing a pellet 42 of phase change or hot melt ink is conveniently formed of a flexible cup 44 having a flange portion 46 adapted to engage with a receiving means (not shown) of an ink jet apparatus. The cup 44, as shown in greater detail in FIGS. 2*b* and 2*c*, is preferably formed with a portion thereof having a substantially elliptical-shaped cross-section 46E. In such a manner, the pellet 42 is retained within the cup 44 while the cup 44 is in an undeformed state. However, by application of an inwardly directed force along the major axis A of the ellipse as shown in FIG. 2*c*, the cup 44 is deformed to a substantially cylindrical cross-section 46C large enough to permit the pellet 42 to fall out from the cup 44 under the influence of gravity. Like the cartridge 10 according to the first embodiment shown in FIGS. 1*a*, 1*b* and 1*c*, the cartridge 40 according to this second embodiment of the invention includes a film 48 which may be comprised of a heat-sealable membrane, an adhesive-coated foil, or the like. In a similar manner, the film 48 may be comprised of a frangible material to obviate its removal so long as the material is compatible with the efficient operation of the ink jet apparatus.

In accordance with one important aspect of this second embodiment of the invention, the cup 44 may be integrally formed of a flexible metal such as aluminum. As so formed, the cup 44 would facilitate the direct pouring of liquified ink into the final cartridge 40, thereby eliminating the need for intermediate steps in the manufacturing process. An aluminum cup 44 would also permit shrinkage of the pellet 42 formed upon solidification of the ink, thereby facilitating free-fall of the pellet 42 into the receiving means (not shown) upon deformation of the substantially elliptical-shaped cross-section 46E to its corresponding substantially cylindrical-shaped cross-section 46C. Again, any other change of shape, from a cross-section adated to retain the pellet 42 to a deformed cross-section which permits the pellet 42 to fall out of the cartridge 40 under the influence of gravity, is considered to be within the teachings of the present invention.

Figure 3A:
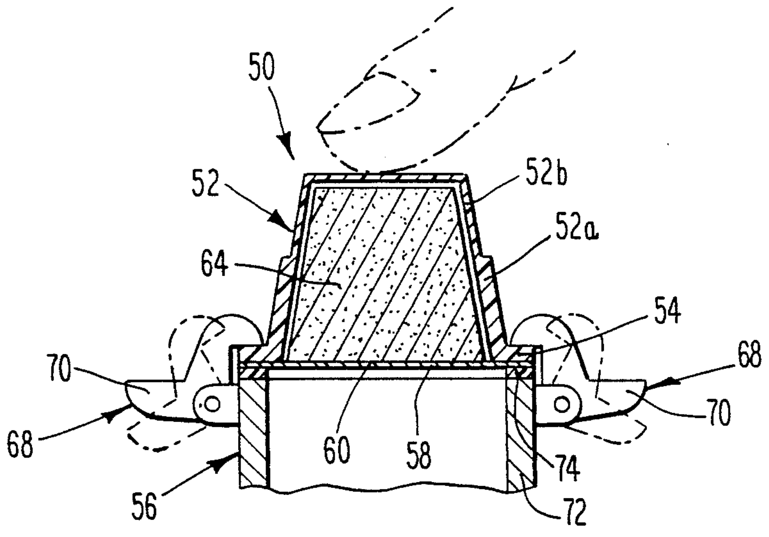
FIGS. 3*a*, 3*b* and 3*c* illustrate a cartridge and method of using the cartridge for phase change ink in an ink jet apparatus according to a third embodiment of the present invention.
Figure 3B:
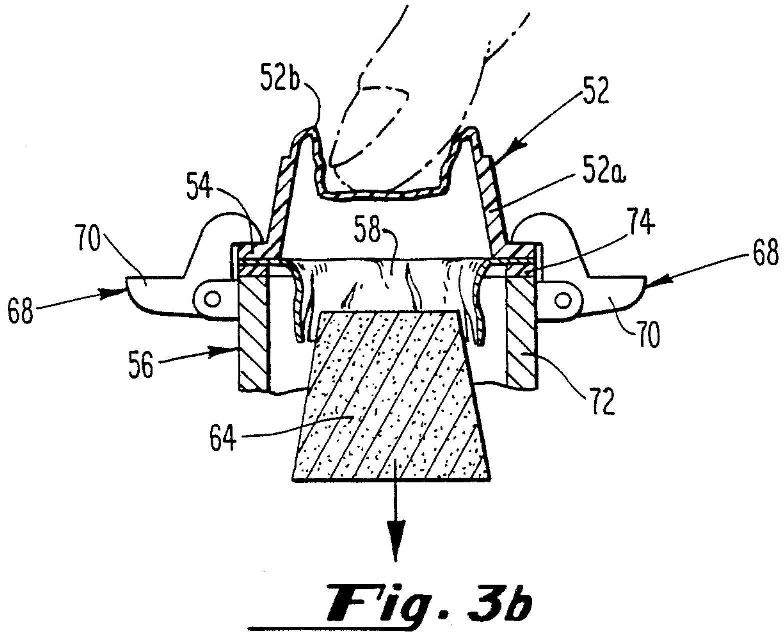
Figure 3C:
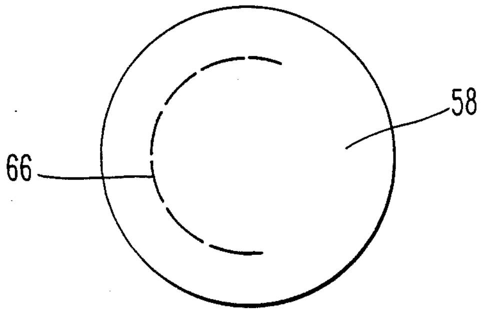

Referring now to FIGS. 3*a*, 3*b* and 3*c*, a cartridge 50 according to a third embodiment of the present invention will be described. Like the cartridge 40 according to the second embodiment shown in FIGS. 2*a*, 2*b* and 2*c*, the cartridge 50 according to this third embodiment is comprised of a cup 52, of a generally truncated conical shape, a flange portion 54 adapted to be engaged with a receiving means 56 of the ink jet apparatus, and a foil or film 58 sealing an open end 60 of the cup 52.

A first portion 52*a* of the cup 52 proximate to its open end 60 is preferably comprised of a wall 62*a* having a predetermined thickness, while a second portion 52*b* is comprised of a wall 62*b* having a thickness less than the predetermined thickness of the wall 62*a*. In such a manner, when the operator (shown diagrammatically by the finger in FIG. 3*b*) depresses the second portion 52*b* after placing the cartridge 50 upon the receiving means 56, the second portion 52*b* will collapse, thereby pushing a pellet 64 of ink contained within the cup 52 into the receiving means 56. The particular arrangement of the walls 62*a* and 62*b* described herein is meant to be illustrative in nature. Any other cartridge arrangement in which a collapsible portion is provided in order to expel the pellet is deemed to fall within the scope of the present invention.

In accordance with another important aspect of the present invention, the cup 52 may be conveniently formed of a plastic (e.g., polyethylene) in order to provide a heat-resistant means for protecting the operator from burn hazards associated with an operating hot melt ink jet apparatus, while at the same time to provide a means for containing the pellet 64 which assures both positive engagement with the receiving means 56 and ready deformation to push the pellet 64 into the receiving means 56.

In accordance with yet another important aspect of the present invention, the foil or film 58 (as well as the films 24*b* and 48 according to the first and second embodiments of the present invention) may be provided with preferential tear lines 66 as shown in FIG. 3*c*. The tear lines 66 may be conveniently stamped or premolded into the film 58 much in the same manner as are "pop-tops" on disposable beverage cans. As a result, risk of introducing debris from the film 58 into the ink jet apparatus is minimized.

Referring again to FIGS. 3*a* and 3*b*, a means 68 for locking the cartridge 50 upon the receiving means 56 is shown. The locking means 68 includes at least two and preferably three latches 70 pivotably coupled to a wall 72 of the receiving means 56, and adapted to engage the flange portion 54 of the cup 52. A gasket 74 may further be provided to ensure proper sealing between the cartridge 50 and the receiving means 56, as well as to prevent entry of contaminants within the ink jet apparatus.

Some of the many advantages of the present invention should now be readily apparent. For example, the above described embodiments not only show an improved cartridge and method of using the cartridge for protecting the phase change or hot melt ink contained within such cartridge from contamination, but also provide an easy means for loading ink into the ink jet apparatus while minimizing the costs associated with producing such cartridges.

Obviously, many modifications and variations of the present invention are possible in light of the above teachings. It is, therefore, to be understood that within the scope of the appended claims, the invention may be practiced otherwise than as specifically described herein.

What we claim is:

1. An improved cartridge for containing a pellet of hot melt ink in an ink jet apparatus having at least one ink jet, a reservoir for containing and melting hot melt ink in its solid state, and means for receiving the cartridge, said receiving means including an outlet at a base thereof for flowing ink into said reservoir, and said pellet being of a size and shape so as to substantially fill said receiving means, wherein the improvement comprises in combination therewith:

a member, open at one end and deformable so as to permit the discharge of said pellet contained therein through said open end, said member having a predetermined geometry corresponding to the geometry of said receiving means;

means for retaining said pellet in said member; and means for sealing said open end.

2. The improvement according to claim 1, wherein said member is open at both ends.

3. The improvement according to claim 2, further comprising flexible means for sealing said other open end.

4. The improvement according to claim 1, wherein said retaining means comprises a rib formed on an interior wall of said member.

5. The improvement according to claim 1, wherein said predetermined geometry of said member comprises a substantially tubular-shape.

6. The improvement according to claim 1, wherein said member comprises an aluminum cup having formed at its open end a flange adapted to be mated with said receiving means.

7. The improvement according to claim 6, wherein said retaining means comprises a portion of said cup at its open end, said portion having a substantially elliptical cross-section adapted to be deformed thereby releasing said pellet from said cup.

8. The improvement according to claim 1, wherein said member comprises a first portion proximate said open end, said first portion having a wall of predetermined thickness, and a second portion at the other end of said member, said second portion having a wall thickness less than said predetermined thickness.

9. The improvement according to claim 8, further comprising a deformable portion attached to and sealing said second portion.

10. A method of storing hot melt ink for use in an ink jet apparatus having at least one ink jet, a reservoir for containing and melting the hot melt ink from its solid state form to a liquid state form, and means for receiving a pellet of hot melt ink in the solid state form, said method comprising the steps of:

(a) providing a deformable, hollow member, open at one end thereof;

(b) filling said member with a predetermined quantity of hot melt ink in the liquid state form;

(c) allowing the member to cool with the quantity of hot melt ink therein so as to permit the hot melt ink in the liquid state form to revert to the solid state form, thereby forming the pellet;

(d) providing means for retaining the pellet within said member; and (e) sealing said open end so as to prevent a contamination of the hot melt ink contained therein.

11. The method according to claim 10, wherein step (a) comprises the steps of:

providing a deformable, substantially tubular-shaped member open at both ends thereof;

providing flexible means for sealing a selected one of said open ends;

coupling said flexible means to close said selected end; and forming means at said other end for mating with the receiving means.

12. The method according to claim 11, further comprising the step of providing a gasket at said other end adapted to seal the ink -jet apparatus upon mating of said member with the receiving means.

13. The method according to claim 10, wherein step (a) comprises the step of providing a substantially metallic cup having relatively thin walls and a generally flat lip portion at its open end.

14. The method according to claim 13, wherein step (d) comprises the steps of:

shaping said cup, before said cooling step, in planes parallel to said open end to form a substantially elliptical cross-section with a major axis and a minor axis; and conforming said minor axis to the pellet, thereby retaining the pellet within said cup.

15. The method according to claim 10, wherein step (a) comprises the step of providing a cup having a first portion adjacent its open end with walls of a predetermined thickness, and a second portion at the other end of said cup, said second portion having a wall thickness less than said predetermined thickness.

16. The method according to claim 15, further comprising the step of providing a generally frustoconically-shaped cup.

17. The method according to claim 10, wherein step (e) comprises the step of providing a membranous material with one or more preferential tear lines formed therein, said membranous material including means for adhering to said member.

18. A method of supplying hot melt ink to an ink jet apparatus having at least one ink jet, reservoir means for melting the hot melt ink from its solid state form to a liquid state form and thereafter containing the hot melt ink in the liquid state form so as to be jettable from the at least one ink jet, and means, in thermal communication with the reservoir means, for receiving a pellet of hot melt ink in the solid state form, wherein the receiving means includes an outlet at a base portion thereof for flowing ink in the liquid state form into the reservoir means, said method comprising the steps of:

(a) providing a deformable, hollow member, open at least at one end thereof;

(b) filling said member with a predetermined quantity of hot melt ink in the liquid state form;

(c) allowing said member to cool with the quantity of hot melt ink therein so as to permit the hot melt ink in the liquid state form to revert to the solid state form, thereby forming the pellet;

(d) providing means for retaining the pellet within said member;

(e) sealing said at least one open end with means so as to form a sealed cartridge which is receivable by the receiving means, thereby preventing a contamination of the hot melt ink contained within said cartridge;

(f) coupling said cartridge to the receiving means;

(g) deforming said member so as to break said seal means and said retaining means, thereby introducing the pellet into the receiving means; and (h) operating the reservoir means so as to melt the pellet contained within the receiving means.

19. The method according to claim 18, wherein step (a) comprises the steps of:

providing a deformable, substantially tubular-shaped member open at both ends thereof;

providing flexible means for sealing a selected one of said open ends;

coupling said flexible means to close said selected end; and forming means at said other end for mating with the receiving means.

20. The method according to claim 19, further comprising the step of providing a gasket at said other end adapted to seal the ink jet apparatus upon mating of said member with the receiving means.

21. The method according to claim 18, wherein step (a) comprises the steps of:

providing a substantially metallic cup having relatively thin walls and a generally flat lip portion at its open end; and shaping said cup, before said cooling step, in planes parallel to said open end to form a substantially elliptical cross-section with a major axis and a minor axis.

22. The method according to claim 21, wherein said shaping step comprises the step of conforming said minor axis to the pellet, thereby retaining the pellet within said cup.

23. The method according to claim 21, wherein said deforming step comprises the steps of:

compressing said cup inwardly along said major axis; and reshaping said cup so as to form a generally circular cross-section in planes parallel to said open end.

24. The method according to claim 18, wherein step (a) comprises the step of providing a cup having a first portion adjacent its open end with walls of a predetermined thickness, and a second portion at the other end of said cup, said second portion having a wall thickness less than said predetermined thickness.

25. The method according to claim 24, further comprising the steps of:

providing a deformable cover portion; and attaching said cover portion to said second portion, thereby sealing same.

26. The method according to claim 24, wherein step (g) comprises the steps of:

applying pressure on said cover portion in a direction toward said open end; and continuing the application of said pressure on said cover portion to collapse the walls of said second portion inwardly toward said first portion;

wherein said cover portion and the walls of said first portion having said predetermined thickness maintain a seal against contamination of the hot melt ink which is thereby introduced into the receiving means.

27. The method according to claim 24, further comprising the step of providing a generally frustoconicallyshaped cup.

28. The method according to claim 18, wherein step (e) comprises the step of providing a membranous material with one or more preferential tear lines formed therein, said membranous material including means for adhering to said member.

29. The method according to claim 18, wherein step (f) further comprises the steps of:

providing latch means for the receiving means, said latch means adaptable for restraining said member mated with the receiving means; and latching said latch means after said member is mated with the receiving means.

* * * * *

UNITED STATES PATENT AND TRADEMARK OFFICE
CERTIFICATE OF CORRECTION

PATENT NO. : 4,823,146

DATED : April 18, 1989

INVENTOR(S) : Theodore M. Cooke et al.

It is certified that error appears in the above-identified patent and that said Letters Patent is hereby corrected as shown below:

Column 4, line 27, please change "lo to --10--.

Signed and Sealed this

Fourteenth Day of November, 1989

*Attest:*

JEFFREY M. SAMUELS

*Attesting Officer* *Acting Commissioner of Patents and Trademarks*